(12) United States Patent
Shapiro

(10) Patent No.: US 10,445,833 B1
(45) Date of Patent: Oct. 15, 2019

(54) METHODS AND SYSTEMS FOR MAXIMIZING SHARE PURCHASE UNDER AN EMPLOYEE STOCK PURCHASE PLAN WITH LIMITED PAYROLL DEDUCTIONS

(71) Applicant: Carver Edison, Inc., New York, NY (US)

(72) Inventor: Aaron J. Shapiro, Briarwood, NY (US)

(73) Assignee: CARVER EDISON, INC., New York, NY (US)

(*) Notice: Subject to any disclaimer, the term of this patent is extended or adjusted under 35 U.S.C. 154(b) by 19 days.

(21) Appl. No.: 15/910,639

(22) Filed: Mar. 2, 2018

Related U.S. Application Data

(60) Provisional application No. 62/466,118, filed on Mar. 2, 2017.

(51) Int. Cl.
*G06Q 40/04* (2012.01)
*G06Q 40/06* (2012.01)
*G06Q 30/06* (2012.01)

(52) U.S. Cl.
CPC ............. *G06Q 40/04* (2013.01); *G06Q 40/06* (2013.01); *G06Q 30/06* (2013.01)

(58) Field of Classification Search
USPC .................................................... 705/35–45
See application file for complete search history.

(56) References Cited

U.S. PATENT DOCUMENTS

| | | | |
|---|---|---|---|
| 5,806,047 A | 9/1998 | Hackel et al. | |
| 5,903,879 A | 5/1999 | Mitchell | |

(Continued)

OTHER PUBLICATIONS

Red Hat to offer employees stock purchase plan as incentive (WRAL Tech Wire) 4 pagesJun. 24, 2016 (Year: 2016).*

*Primary Examiner* — Bruce I Ebersman
(74) *Attorney, Agent, or Firm* — DeLio Peterson & Curcio LLC; David R. Pegnataro

(57) ABSTRACT

A method of maximizing the number of shares purchased under an ESPP with limited employee capital contributions, comprising the steps of selecting a monetary contribution amount or an amount to be deducted from an employee's monetary compensation for contribution to the plan, wherein the contribution amount is less than a maximum allowable contribution under allowable limits of the plan; selecting a rebalancing price at which the employee wishes to sell shares of employer stock at the end of an offering period under the plan; taking a simultaneous short and long position in derivative or other financial instrument that would allow for the disposition of shares acquired in the plan at an employee-designated strike price, the short and long positions having different strike prices; having a third party or broker-dealer provide a supplemental monetary contribution equal to a difference between the employee's selected contribution amount and the maximum allowable contribution under the plan over the course of the offering period on behalf of the employee to the employer, the supplemental monetary contribution received by a financial or ledger account used to purchase shares via the plan at the end of the offering period; and the delivery of shares to a financial market counterparty or open market transaction to repay the proceeds of a interest free loan and comply with employee elections.

18 Claims, 7 Drawing Sheets

(56) References Cited

U.S. PATENT DOCUMENTS

| | | | |
|---|---|---|---|
| 6,092,047 A | 7/2000 | Hyman et al. | |
| 6,161,096 A * | 12/2000 | Bell | G06Q 10/10 705/1.1 |
| 6,173,270 B1 * | 1/2001 | Cristofich | G06Q 40/00 705/37 |
| 6,571,219 B1 * | 5/2003 | Spivey | G06Q 40/00 705/35 |
| 6,609,111 B1 * | 8/2003 | Bell | G06Q 10/10 705/1.1 |
| 7,096,194 B2 * | 8/2006 | Johnson | G06Q 40/00 705/35 |
| 7,337,141 B2 * | 2/2008 | Sullivan | G06Q 20/382 705/36 R |
| 7,529,701 B2 * | 5/2009 | Shields | G06Q 30/02 705/35 |
| 7,590,577 B1 * | 9/2009 | Swint | G06Q 40/00 705/35 |
| 7,590,580 B2 * | 9/2009 | Spivey | G06Q 40/00 705/35 |
| 9,330,415 B1 | 5/2016 | Castleman et al. | |
| 9,998,147 B1 * | 6/2018 | Dubucq | H03M 13/05 |
| 2002/0032636 A1 | 3/2002 | Shields et al. | |
| 2002/0038271 A1 | 3/2002 | Friend et al. | |
| 2002/0042771 A1 * | 4/2002 | Shields | G06Q 30/02 705/37 |
| 2002/0194136 A1 * | 12/2002 | Sullivan | G06Q 20/382 705/64 |
| 2003/0105698 A1 * | 6/2003 | Gusler | G06Q 40/04 705/36 R |
| 2004/0122759 A1 | 6/2004 | Spivey | |
| 2004/0172349 A1 * | 9/2004 | Quinn | G06Q 40/00 705/35 |
| 2004/0267656 A1 * | 12/2004 | Friedman | G06Q 40/00 705/37 |
| 2005/0010518 A1 * | 1/2005 | Friedman | G06Q 40/04 705/37 |
| 2005/0027627 A1 | 2/2005 | Lemken, Jr. et al. | |
| 2005/0114242 A1 * | 5/2005 | Gray | G06Q 40/00 705/35 |
| 2005/0137967 A1 * | 6/2005 | Ryan | G06Q 40/00 705/38 |
| 2005/0192875 A1 * | 9/2005 | White | G06Q 20/10 705/30 |
| 2006/0184446 A1 * | 8/2006 | Ross | G06Q 40/04 705/37 |
| 2006/0282363 A1 | 12/2006 | Tarbox et al. | |
| 2007/0083455 A1 * | 4/2007 | Bove | G06Q 40/00 705/36 T |
| 2007/0100726 A1 | 5/2007 | O'Flinn et al. | |
| 2008/0133393 A1 * | 6/2008 | Arnold | G06Q 40/00 705/37 |
| 2011/0106689 A1 * | 5/2011 | Ryan | G06Q 40/025 705/38 |
| 2011/0173138 A1 * | 7/2011 | Ryan | G06Q 40/00 705/36 T |
| 2013/0282544 A1 | 10/2013 | Feinschreiber | |
| 2015/0134567 A1 * | 5/2015 | Maher | G06Q 40/06 705/36 R |
| 2016/0225081 A1 * | 8/2016 | Hecht | G06Q 40/04 |

\* cited by examiner

| Employee Contribution | Proposed | | | |
|---|---|---|---|---|
| | Total Shares Purchased | Shares Sold To Cover Loan | Long Term Shares | Employee Profit |
| 1% | 588.24 | 375.00 | 213.24 | $746.32 |
| 2% | 588.24 | 333.33 | 254.90 | $892.16 |
| 3% | 588.24 | 291.67 | 296.57 | $1,037.99 |
| 4% | 588.24 | 250.00 | 338.24 | $1,183.82 |
| 5% | 588.24 | 208.33 | 379.90 | $1,329.66 |
| 6% | 588.24 | 166.67 | 421.57 | $1,475.49 |
| 7% | 588.24 | 125.00 | 463.24 | $1,621.32 |
| 8% | 588.24 | 83.33 | 504.90 | $1,767.16 |
| 9% | 588.24 | 41.67 | 546.57 | $1,912.99 |
| 10% | 588.24 | 0.00 | 588.24 | $2,058.82 |

| | Traditional | | | |
|---|---|---|---|---|
| | Total Shares Purchased | Shares Sold To Cover Loan | Long Term Shares | Employee Profit |
| 1% | 58.82 | 0.00 | 58.82 | $205.88 |
| 2% | 117.65 | 0.00 | 117.65 | $411.76 |
| 3% | 176.47 | 0.00 | 176.47 | $617.65 |
| 4% | 235.29 | 0.00 | 235.29 | $823.53 |
| 5% | 294.12 | 0.00 | 294.12 | $1,029.41 |
| 6% | 352.94 | 0.00 | 352.94 | $1,235.29 |
| 7% | 411.76 | 0.00 | 411.76 | $1,441.18 |
| 8% | 470.59 | 0.00 | 470.59 | $1,647.06 |
| 9% | 529.41 | 0.00 | 529.41 | $1,852.94 |
| 10% | 588.24 | 0.00 | 588.24 | $2,058.82 |

| | Improvement Versus Traditional | | | |
|---|---|---|---|---|
| | Total Shares Purchased | Shares Sold To Cover Loan | Long Term Shares | Employee Profit |
| 1% | 900% | - | 263% | 263% |
| 2% | 400% | - | 117% | 117% |
| 3% | 233% | - | 68% | 68% |
| 4% | 150% | - | 44% | 44% |
| 5% | 100% | - | 29% | 29% |
| 6% | 67% | - | 19% | 19% |
| 7% | 43% | - | 13% | 13% |
| 8% | 25% | - | 7% | 7% |
| 9% | 11% | - | 3% | 3% |
| 10% | 0% | - | 0% | 0% |
| Average Outperformance | 193% | - | 56% | 56% |

METHODS AND SYSTEMS FOR MAXIMIZING SHARE PURCHASE UNDER AN EMPLOYEE STOCK PURCHASE PLAN WITH LIMITED PAYROLL DEDUCTIONS

BACKGROUND OF THE INVENTION

1. Field of the Invention

The present invention relates generally to employee stock purchase plans ("ESPP"), whether qualified or non-qualified, as defined by the IRS. More particularly, the present invention relates to systems and methods for providing a free solution to allow employees to purchase the maximum number of shares under their ESPP with limited capital contributions from payroll deductions.

2. Description of Related Art

Several thousand publicly traded employers offer compensation to their employees in the form of equity. Some forms of equity compensation plans include employee stock purchase plans ("ESPP"), restricted stock unit plans ("RSU"), and employee stock option plans. Equity compensation plans provide benefits for both the employer and the employee. Employers benefit by, in many cases, generating a tax asset to offset the cost of dilution, while employees enjoy the economic benefit of purchasing company stock. Employee stock purchase plans are known and exist in several different forms. An employee stock purchase plan is generally a contractual right granted to employees that gives employees the option to purchase company stock at the end of a specified period, typically at a discount to the market price or at a previously specified price.

At the beginning of an offering period, an employee who wishes to participate in an ESPP typically indicates the percentage or dollar amount of compensation to be deducted from their payroll every pay period. Under most stock purchase plans, the purchase price is set at a discount from the fair market price of the stock. In many plans, the discount is applied to the value of the stock on the first or last day of an offering period, whichever is lower (otherwise known as a "lookback"). Some plans allow employees to increase or decrease their payroll deduction percentage throughout the offering period. Ultimately, the design of employee stock purchase plans varies greatly across companies. Some companies currently offer plans with a limited discount while others provide a subsidy or loan provision for employees.

Although the IRS limits purchases under an employee stock purchase plan to $25,000, many companies further restrict the value of stock purchases to the plan to ten percent (10%) of an employee's income. For example, assume Company XYZ allows Employee A to contribute a maximum of 10% annually of their $50,000 per year income to an employee stock purchase plan, with an offering period of one year (for illustrative purposes, tax consequences are not included, and all numbers are on an annual basis). Under the plan rules set forth by Company XYZ, an employee would be able to contribute $5,000 annually to the plan, as compared to $25,000 under the IRS restrictions. Further, the plan offers a fifteen percent (15%) discount, with a lookback feature that applies the 15% discount to the lower of the two market values at the beginning and end of the offering period. Assume further that shares of Company XYZ are trading at $10 per share at both the beginning and end of the offering period. For exemplary purposes only, the offering period is presumed to have a length of one year. Although Employee A could contribute 10% of their income under the terms of the plan, Employee A elects to contribute only five percent (5%) of their income because of personal liquidity constraints. Consequently, at the end of the offering period, Employee A is only able to purchase 294.12 shares (($50,000*5%=$2,500)/($10*(100%-15%))=294.12), as compared to 588.24 shares (($50,000*10%=$5,000)/($10*(100%-15%))=588.24) had Employee A maximized their contribution to their employee stock purchase plan. The employee would stand to purchase an additional 294.12 shares by maximizing their contribution.

Accordingly, by contributing 5% to the ESPP, the employee recognized $441.18 (($10-$8.50=$1.5)*(294.12)=$441.18) in capital gains as compared to $882.36 (($10-$8.50=$1.5)*(588.24)=$882.36) if the employee would have contributed 10% to the plan. In this example, by choosing to contribute 5% instead of 10% to the ESPP, Employee A surrendered $441.18 in risk free profit (assuming the immediate sale of the securities).

Currently known employee stock purchase plans have several distinct disadvantages for both employees and employers. The capital requirements associated with fully contributing to an employee stock purchase plan are burdensome and unfeasible for many rank and file employees, as the employee must contribute after-tax dollars to the plan. Many of these employees require the additional capital to support their families or meet other similar financial obligations. Consequently, according to a recent Fidelity study, the average participation rate in ESPPs nationally is 30%. By not participating in an employer's ESPP, the average employee forfeits an estimated $3,331 annually on an after tax basis, according to a recent academic study. The Federal Reserve Bank of St. Louis has calculated that the Real Median Personal Income nationally is $31,009.00; therefore, it is estimated that an employee forfeits nearly 11% of their annual salary by not maximizing their contribution to their ESPP. The interest rate charged by many banks for unsecured loans that could be used to purchase stock as part of the ESPP makes borrowing from a bank or other lenders economically unfeasible.

Lack of employee participation is also costly for employers. When an employee purchases shares at a discount via their ESPP, the employer recognizes a tax write-off so long as the employee sells their shares within two years of the grant date. The employer's write-off is the difference between the cost basis and the price at which the shares are sold. For example, if an employee purchases shares at $8.50 and sells the shares within two years at $10 per share, the employer is entitled to a $1.50 ($10-$8.50) tax write-off as specified in Section 423 of the Internal Revenue Code (the "Code"). According to a recent Fidelity study, nearly half of all employees sell their shares within the first two years, i.e. make a disqualifying disposition. Accordingly, employers of sufficient size forfeit several million dollars per year in the form of a tax write-off by lack of employee participation. Although some employers have added loan or subsidy programs as part of their ESPP to facilitate employee participation, the complexity and balance sheet requirements have made such plans unpopular. Consider, for example, if half of the 10,000 employees at a public company where the average salary is $50,000 took advantage of their company's loan or subsidy program. The employer would be required to use $25,000,000 of capital on its balance sheet to facilitate such a program. The cost of capital alone makes such a large commitment of capital impractical for most employers.

Therefore, a need exists for a new financial product with improved methods and systems to provide employees with a free solution to maximize the number of shares purchased under their ESPP, with limited capital contributions, while shifting the cost and capital burden away from employers.

SUMMARY OF THE INVENTION

Bearing in mind the problems and deficiencies of the prior art, it is therefore an object of the present invention to provide a new financial product comprising a free method to allow employees to maximize the number of shares purchased in an offering period under their ESPP without contributing the maximum allowable contribution under the terms of the plan. Such method is not only a new and useful process beyond a fundamental economic concept but also a new and useful improvement of traditional employee stock purchase plans. The present new and useful process provides concrete and tangible improvements by ensuring that an employee always purchases the maximum number of shares possible under their plan regardless of their ability to afford payroll deductions.

It is yet another object of the present invention to provide an improved method for maximizing the number of shares purchased under an ESPP which shifts the costs away from the employee and employer to financial market participants.

Still other objects and advantages of the invention will be apparent from the specification.

The above and other objects, which constitute a unique application of concepts from the insurance, employee benefits and finance industries which would not be apparent to those skilled in the art, are achieved in the present invention which is directed to a method of maximizing the number of shares purchased under an ESPP regardless of an employee's ability to afford payroll deductions. The method comprises an enrollment process whereby the employee selects a percentage of their income to contribute to the ESPP (which is less than the maximum allowable percentage or amount under the limits of the plan) and selects a price at which the employee would sell some portion of their shares at a future date, having an independent broker-dealer sell a derivative or other financial instrument to a counterparty in the financial markets, making an interest-free loan on behalf of the employee representing the difference between the plan maximum and the employee's selected contribution, the subsequent purchase of securities under the ESPP, sale of these securities via an open market transaction or delivery of shares to counterparty depending on the underlying stock price movement during the life of the offering period, the debit of loan principal from the proceeds of such a sale or delivery to the third party broker-dealer to repay the interest-free loan and the deposit of remaining shares not sold to repay the loan or fulfill employee elections in the employee's brokerage account.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 6 is a table quantifying a theoretical employee's profit improvement of the method of the present invention over traditional employee stock purchase plans.

FIG. 7 is a table showing an exemplary capital flow analysis associated with a hypothetical employee utilizing the methodology of the present invention.

DESCRIPTION OF THE EMBODIMENT(S)

In describing the embodiments of the present invention, reference will be made herein to FIGS. 1-7 of the drawings, in which like numerals refer to like features of the invention.

In describing the embodiments of the present invention herein, the word "exemplary" is used to mean serving as an example, instance or illustration. Any aspect or design described herein as "exemplary" is not necessarily intended to be construed as preferred or advantageous over other aspects or design. Rather, the use of the word "exemplary" is merely intended to present concepts in a concrete fashion.

The present invention generally provides methods and systems, e.g., computer-implemented methods and computer systems, for maximizing the number of shares an employee is able to purchase under their employee stock purchase plan ("ESPP") with limited employee capital contributions. As used herein, the terms "employee stock purchase plan" or "ESPP" may be used interchangeably to generally describe a qualified employee stock purchase plan under Section 423 of the Internal Revenue Code, or a non-qualified employee stock purchase plan structured like a qualified 423 plan but without the preferred tax treatment for employees, including but not limited to, employee stock purchase plans, employee stock ownership plans, employee stock purchase deposit plans, and profit sharing plans, or the like.

The methodology of the present invention provides a significant quantifiable improvement over existing ESPP's. In contrast to conventional ESPP's, the present invention allows every employee to purchase the maximum number of shares possible under their ESPP regardless of their ability to afford payroll deductions, shifts the cost and capital requirements of the plan away from employees and employers to financial market participants, and maximizes the potential tax write-off for employers.

Figure 1:
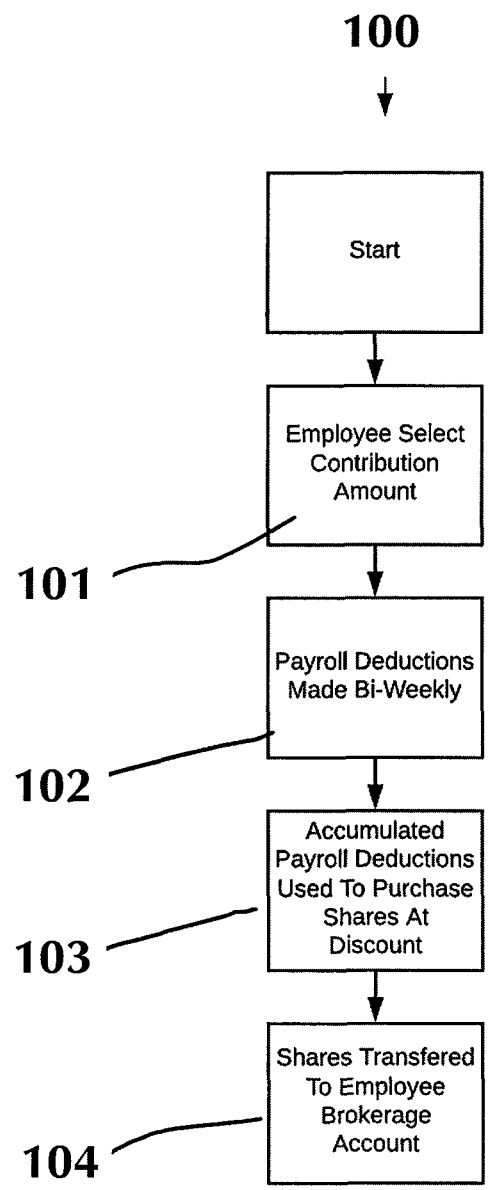
FIG. 1 is a flow diagram showing a traditional employee stock purchase plan of the prior art.

FIG. 1 is a flow diagram showing a traditional ESPP process 100. At the beginning of an offering period, an employee who wishes to participate in his or her employer's ESPP indicates the percentage or dollar amount of compensation to be deducted from their payroll every pay period for contribution to the ESPP (step 101). Payroll deductions are then made (step 102), for example, bi-weekly, and the accumulated payroll deductions are used to purchase shares of employer stock at the end of an offering period (step 103), typically at a discount from the fair market value of the shares. The shares are then transferred to the employee's brokerage account, at which point the shares are wholly owned and controlled by the employee (step 104). Under a traditional ESPP, the ability of the employee to purchase employer stock is often limited by the employee's liquidity. For example, if an employee is only able to contribute 2% of their income to the plan, with a maximum allowable contribution of 10%, the employee would forfeit the remaining 8% they were eligible to contribute but couldn't afford to.

The method of the present invention draws on concepts from traditional ESPPs to create a new financial product which provides a means for an employee to purchase the maximum number of shares under their ESPP with limited capital contributions from payroll deductions. Further, the methodology of the present invention shifts the costs away from the employee and employer to third party financial market participants who provide an interest-free capital contribution or loan in order for the employee to purchase the maximum amount of shares during the offering period.

Figure 2:
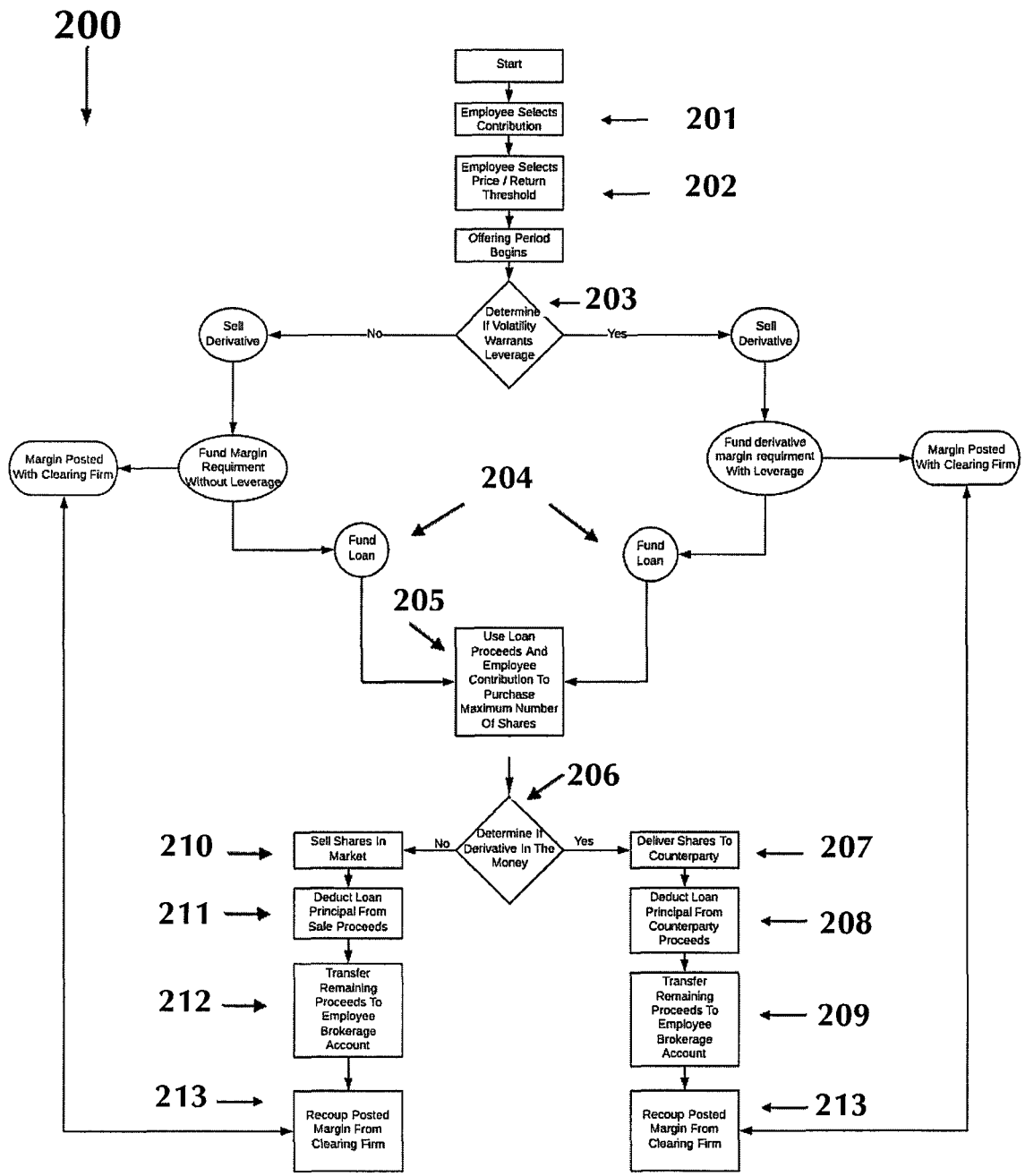
FIG. 2 is a flow diagram showing an embodiment of the methodology for maximizing share purchase of the present invention.

Referring now to FIGS. 2-7, collectively, an overview of the methodology of the present invention is depicted. FIG. 2 depicts a process diagram showing an overview of an embodiment of the method 200 of the present invention. The method comprises, during the pre-enrollment period, the employee selecting a desired monetary contribution amount (step 201), which is less than the maximum allowable contribution under the ESPP, and selecting a rebalancing threshold or price (step 202). The rebalancing threshold is the price at which the employee is willing to sell shares of stock at the end of the offering period, and may be calculated, for example, as a theoretical stock price, an annualized return, or a minimum internal rate of return ("IRR"). It should be understood by those skilled in the art that the rebalancing threshold may be calculated by any now known or later developed method of calculation, and that the present invention is not limited to the methods of calculation as described herein.

Figure 5:
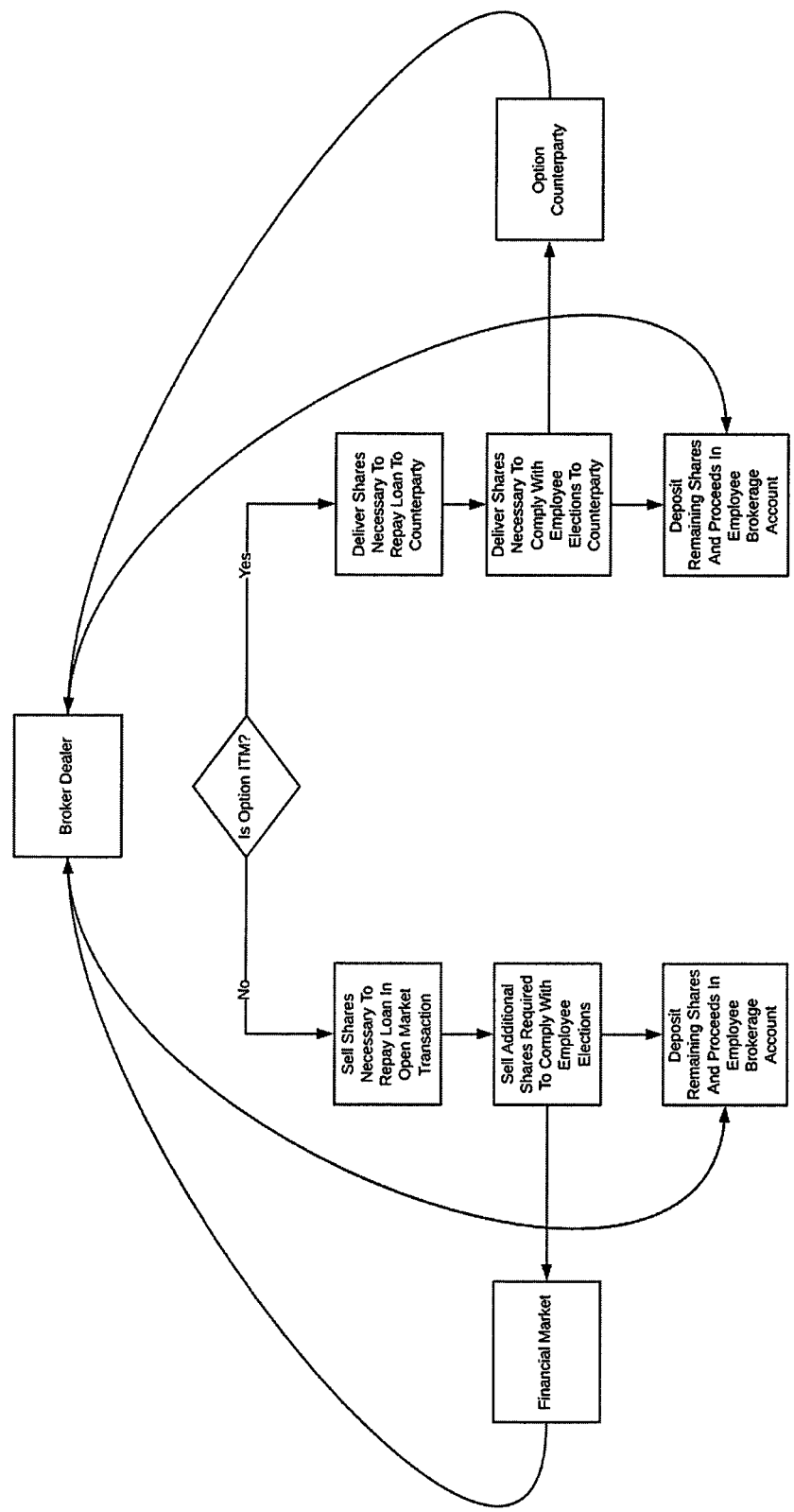
FIG. 5 is a flow diagram showing an exemplary option exercise according to an embodiment of the method of the present invention as shown in FIG. 2.

The method further comprises, at step 203, determining whether volatility of the stock warrants using leverage and then selling or instructing a designated broker to sell or take both a simultaneous "short" and "long" position in any derivative instrument including but not limited to, options, futures, swaps, or the like, at a strike price designated by the employee (see also FIG. 5, depicting the general mechanics of the option). The principles of security instruments such as derivatives, options, futures, or swaps are generally known in the art, and therefore a detailed description of the respective mechanics is not included herein. As used herein, the terms "derivative" or "option" may be used interchangeably to represent any security instrument utilized by the designed broker. It should be understood by those skilled in the art that the present invention encompasses the use of any now known or later developed security instrument, and is not limited to those described herein. The purpose of selling such a security is not to hedge but rather to lock in a point at which an employee would sell their shares in the future. This concept is referred to as "rebalancing" in the investment management industry. The strike price is either computed by solving for the price that the underlying stock price must reach to achieve the employee-specified internal rate of return or by using the user-specified theoretical price. The broker-dealer selling the option posts the necessary margin with a clearing firm.

At step 204, the broker-dealer then makes an interest-free loan on behalf of the employee and uses the aggregate capital contributions (loan principal and employee payroll deductions) to purchase shares of employer stock on behalf of the employee at the purchase price designated by the employee's ESPP (step 205). Step 206 comprises determining whether, at the end of the offering period, the derivative is in-the-money ("ITM") or out-of-the-money ("OTM"). If the derivative is ITM, the requisite number of shares to fulfill any obligation under the option contract is delivered to the counterparty. The counterparty returns to the broker-dealer the proceeds from the sale of the shares (strike price multiplied by number of shares). The broker-dealer then deducts the loan principal from the proceeds and transfers any remaining shares and/or profits from the sale to the employee's brokerage account (steps 207 to 209). The proceeds of the derivative are credited to a separate bank account owned exclusively by the third party administrator or broker-dealer. Upon completion of the transaction, the broker dealer recoups the margin posted with the clearing firm (step 213).

Conversely, if the derivative is OTM, the requisite number of shares to fulfill any obligation under the option contract is sold in the open market (step 210). The broker-dealer then deducts the loan principal from the proceeds from the sale of the shares and transfers any remaining shares and/or profit from the sale to the employee's brokerage account (steps 211 to 212). Upon completion of the transaction, the broker dealer recoups the margin posted with the clearing firm (step 213).

A unique aspect of the methodology of the present invention is that there is no risk to the broker-dealer in providing the initial loan or supplemental monetary contribution on behalf of the employee. At the end of the offering period, whether or not the derivative is ITM or OTM, shares of stock are purchased and a portion of the shares sufficient to reimburse the loan principal provided by the broker-dealer is immediately sold to cover the loan. As such, the broker-dealer will always be made whole, while the employee has the opportunity to achieve increased profits from the purchase of shares as if the employee had initially maximized their contribution to their ESPP.

Figure 3:
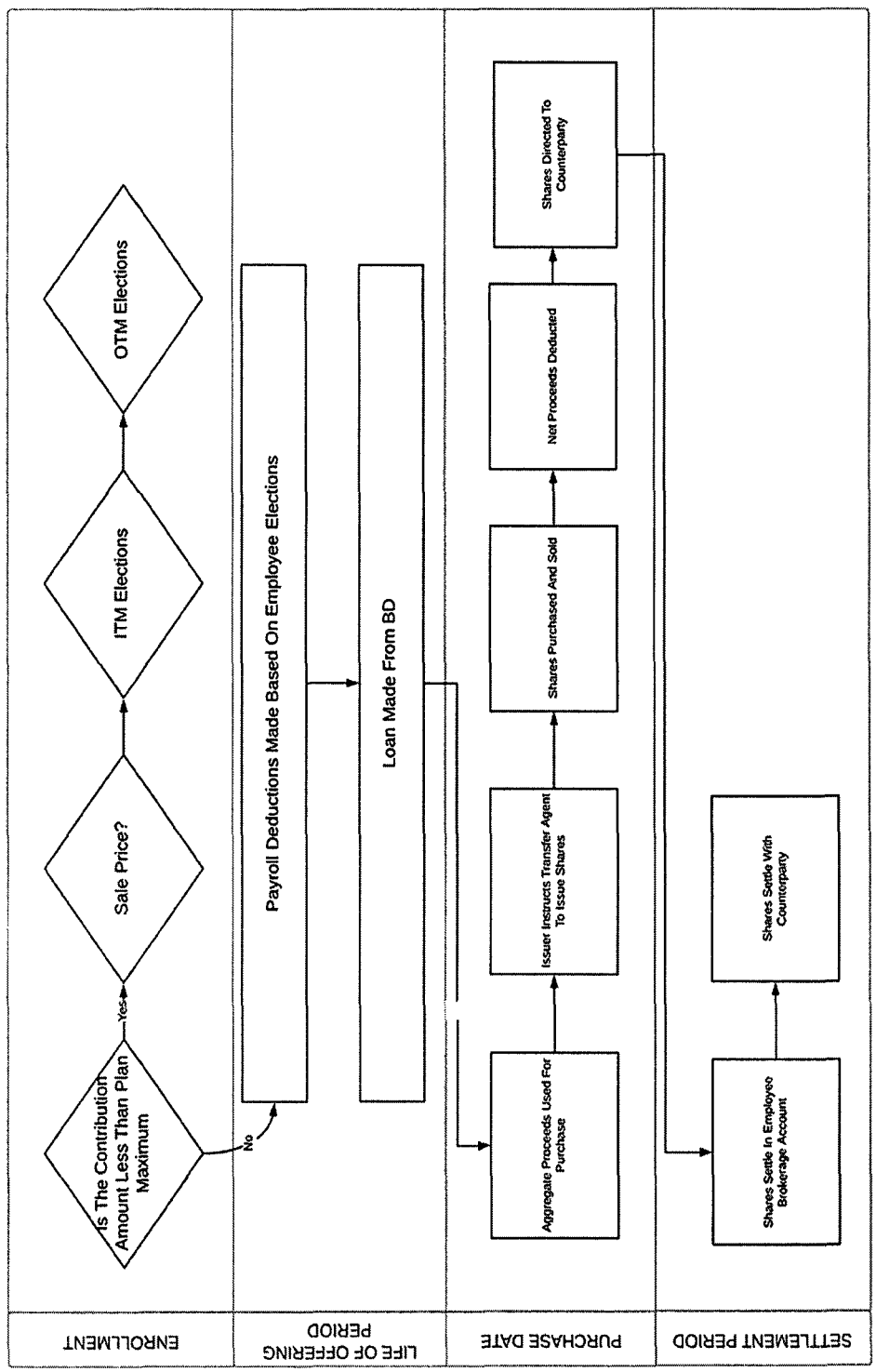
FIG. 3 is a flow chart showing an exemplary timeline according to an embodiment of the method of the present invention.
Figure 4:
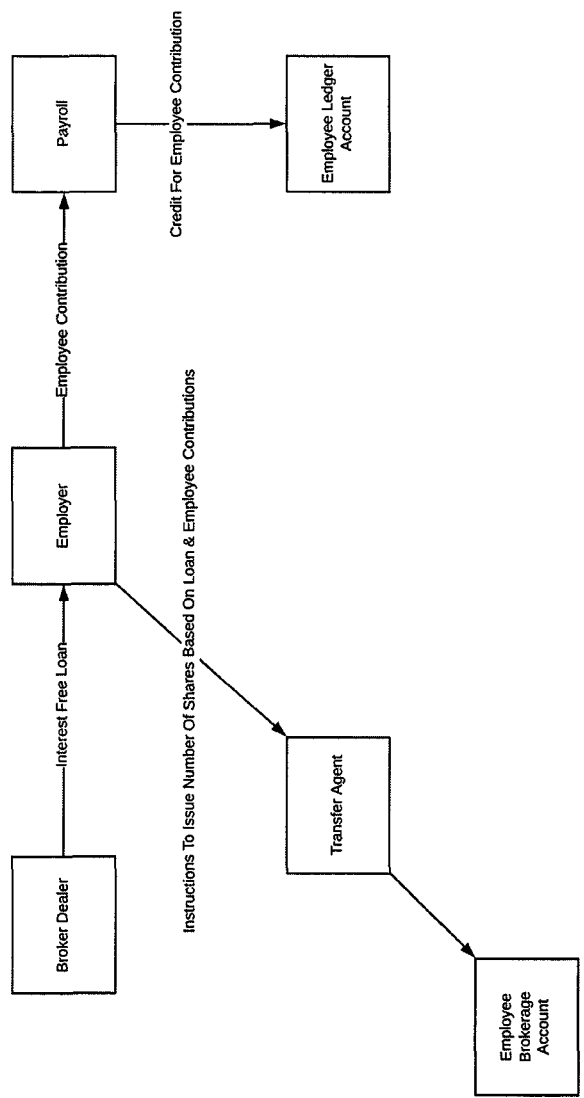
FIG. 4 is a block diagram showing exemplary loan mechanics according to an embodiment of the method of the present invention as shown in FIG. 2.

FIG. 3 depicts a transactional flowchart representing the distinct time periods of the methodology of the present invention. During the pre-enrollment block 300, the employee selects a monetary contribution rate or amount to be contributed to the ESPP in after-tax dollars. If the employee elects to maximize their contribution, no further action is required during the pre-enrollment period and the ESPP operates as a traditional ESPP. By contrast, if the employee elects to contribute less than the maximum allowable under the terms of the plan, the employee then selects a theoretical price or minimum internal rate of return ("IRR") at which the employee would sell their shares at the end of the offering period. Lastly, the employee selects a number or percentage of shares to be sold in addition to the number of shares required to repay the loan in the event that the stock price meets or exceeds the sale price (in-the-money or "ITM") or in the event the stock price does not meet or exceed the sale price (out-of-the-money or "OTM"). A third party broker-dealer then sells a derivative instrument to a financial market counterparty whereby the broker-dealer posts the necessary margin requirement with the appropriate clearing firm. During the offering period (block 310), the employee's elected monetary contribution is deducted from payroll and combined with a supplemental monetary contribution or loan from a third party or broker-dealer equal to the difference between the employee's selected contribution amount and the maximum allowable contribution under the plan over the course of the offering period. The mechanics of the loan are more particularly shown in FIG. 4. On the purchase date (block 320), the aggregate proceeds, which includes payroll deductions and loan proceeds, are used to purchase shares of stock. At the end of the offering period (block 330), the broker-dealer purchases shares using the aggregate contribution and then delivers shares to the option counterparty, if necessary ("transaction" or "sale transaction"). If the employee had shares remaining after selling to cover the proceeds of the loan, the broker-dealer deposits the shares in the employee's brokerage account.

FIG. 6 shows a table quantifying a theoretical employee's profit improvement in accordance with the methodology of the present invention over traditional employee stock purchase plans. As shown in FIG. 6, the maximum number of stock shares that can be purchased under a theoretical ESPP is 588.24 shares, if the maximum 10% monetary contribution allowable under the terms of the plan is made. In the proposed method of the present invention, regardless of the employee's capital contribution, 588.24 shares are purchased, of which a number of shares must immediately be sold to cover the supplemental monetary contribution or loan made by the broker-dealer. For example, if the employee contributes 5% and the broker-dealer also contributes 5%, 208.33 shares must be sold to cover the loan, resulting in 379.90 long term shares held by the employee, for a profit of $1329.66. By contrast, in the traditional ESPP, the amount of shares available for purchase is limited by the employee's capital contribution. Under a traditional ESPP, a theoretical employee would only be able to purchase 294.12 shares with an initial contribution of 5% (with no shares required to be sold because there was no loan) for a profit of $1029.41. As such, the theoretical employee enjoys an increased profit of 29% when utilizing the methodology of the present invention over a traditional ESPP, at a 5% contribution. As further shown in FIG. 6, the method of the present invention results in an average outperformance in the number of total shares purchased of 193% for contributions up to a maximum allowable monetary contribution of 10%, with an average outperformance in employee profit of 56% over a traditional ESPP. It should be understood by those skilled in the art that a maximum allowable contribution of 10%, as shown in FIG. 6, is being used for exemplary purposes only, and that the maximum allowable contribution may be less than or greater than 10%, in accordance with a particular employer's plan.

Figure 7:
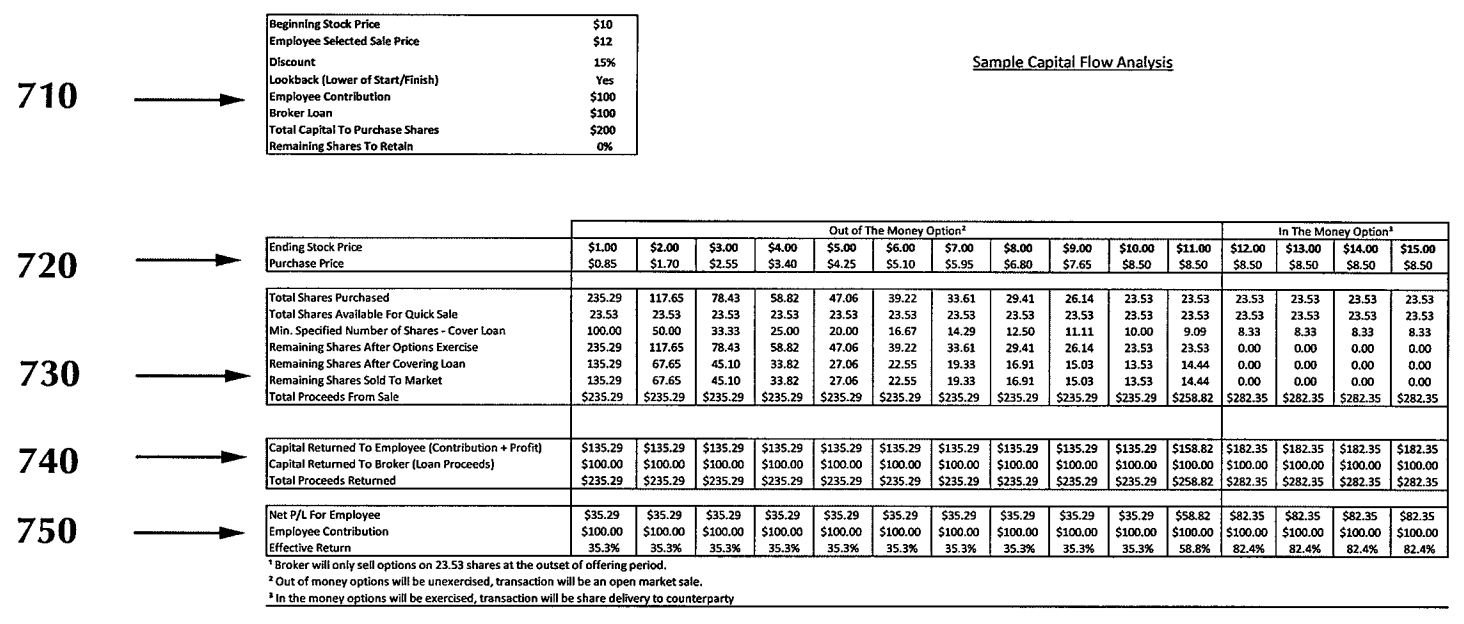

FIG. 7 shows an exemplary cash flow analysis for a theoretical employee in accordance with the methodology of the present invention, as described above. In this example, as shown at block 710, the employer stock price at the beginning of the offering period is $10 per share (with a 15% discount under the ESPP and "lookback" feature), and the employee has selected a strike price of $12 per share. Under the terms of the ESPP, the employee can contribute a maximum of $200 but due to personal liquidity constraints, the employee elects to contribute $100, of which the remaining $100 is contributed interest-free by a broker-dealer, for a total contribution in the maximum allowable amount of $200. Block 720 depicts the actual stock purchase price for various ending stock prices ranging from $1.00 through $15.00. Share prices at the end of the offering period exceeding the employee-designed strike price of $12 represent in-the-money or ITM options. Pursuant to the option contract, the purchase price is $12 per share regardless of whether actual share price at the end of the offering period exceeds $12 per share. Out-of-the-money or OTM options are unexercised, and the transaction will be an open market sale.

Block 730 shows that 23.53 shares were purchased at the discounted price of $8.50 per share, and that all 23.53 shares were then sold, at the end of the offering period. If the shares were sold at the strike price of $12.00, the total proceeds of the sale would equal $282.35. The total proceeds returned therefore would also equal $282.35, of which the initial $100 contribution is returned to the broker-dealer interest-free, and the employee realizes a capital return of $182.35 (block 740), for a net profit of $82.35 and an effective return of 82.4% for the employee (block 750).

In another aspect of the present invention, an employee may select a theoretical share price, minimum annualized return, or internal rate of return from shares of the employee stock purchase plan in which they would agree to sell their shares. The method includes the steps of: establishing a unique digital account for each employee on a web or server based platform; and prompting the employee to select one of several minimum share prices, annualized returns or internal rate of returns. The annualized return is calculated using the forecasted date of each employee contribution, the forecasted number of shares the employee will be able to buy at the end of the offering period and the estimated minimum total profit from the sale. The employee's preferred minimum annualized rate of return or imputed premium to the current trading price is then stored for future use, unless otherwise specified by an employee.

The present invention is further directed to a system that includes at least one computing device having software associated therewith that when executed is capable of performing a method to sell or instruct a broker to sell derivative instruments. The method includes the steps of: establishing an account with the broker to be owned by the company funding the difference in contributions or using a "broker assisted cashless exercise"; communicating via electronic transmission to the broker the forecasted number of derivative contracts to be sold short and long as well as the expiration date and strike price for each contract; and transferring property equivalent to the margin requirement into the account owned by the company funding the contribution difference. At least one step of the method is preferably accomplished by at least one computing device but may be completed manually.

In another aspect of the invention, a system is provided that includes at least one computing device having software associated therewith that when executed is capable of performing a method that segments shares purchased via the employee stock purchase plan into two categories: 1) shares for delivery to option holder or broker and 2) shares to be sold directly or by broker, the proceeds of which will be returned to the employee. The method includes the steps of: transferring a number of shares equal to the number of shares purchased at the purchase date by all employees in which the underlying stock price has exceeded the preselected strike price selected by the employee into an account owned by the company funding the contribution difference; delivering said shares the owner of the option being exercised; transferring the appropriate pro-rata amount of capital from the account to which the option holders transferred the cash to settle the options delivery to an employee owned account; and transferring the proceeds of the sale of the shares not delivered to option holders to an account owned by the employee. At least one step of the method is preferably accomplished by at least one computing device but may be completed manually.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." The present invention may take the form of a computer program product embodied in one or more computer readable medium(s) having computer readable program code embodied thereon.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Python, C++ or the like and conventional procedural programming languages, such as the "C" programming language or similar programming languages. The program code may execute entirely on the user's computing device (such as, a computer), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

The present invention is described herein with reference to flowchart illustrations and/or block diagrams of methods, apparatus (systems), computer readable media, non-transitory computer readable media, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in the flowchart and/or block diagram block or blocks.

It should be appreciated that the function blocks or modules shown in the drawings illustrate the architecture, functionality, and operation of possible implementations of systems, methods and computer program media and/or products according to various embodiments of the present invention. In this regard, each block in the drawings may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved. It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

Thus, the present invention achieves one or more of the objects above and provides a method for an employee to maximize the number of shares purchased under their ESPP without contributing the maximum allowable contribution under the terms of the plan. The method provides for a third party administrator or broker taking a simultaneous short and long position in derivative or other financial instruments (with different strike prices) that would allow for the disposition of shares acquired in the ESPP at an employee designated strike price, with the third party contributing the difference between the employee's contribution and the maximum allowable by the employer or law (whichever is lower) at the end of the offering period to an account used to purchase shares via the ESPP, and further selling the shares at the appropriate price and time and returning the proceeds from the sale of shares, equivalent to the proceeds from the plan if the employee had initially maximized their contribution to the plan. In contrast to traditional ESPP's, the methodology of the present invention allows every employee to purchase the maximum number of shares possible under their ESPP regardless of their ability to afford payroll deductions, shifts the cost and capital requirements of the plan away from employees and employers to financial market participants, and maximizes the potential tax write-off for employers.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of maximizing a number of shares purchased under an employee stock purchase plan with limited employee capital contributions, comprising the steps of:

selecting, via an electronic enrollment interface for the employee stock purchase plan by each of a plurality of employees of an employer, a monetary contribution amount for contribution to the employee stock purchase plan to be deducted from a compensation of each of the plurality of employees per payroll period, wherein the selected monetary contribution amount is less than or equal to a maximum allowable contribution under allowable limits of the employee stock purchase plan, the electronic enrollment interface comprising a graphical user interface for permitting selection of enrollment parameters by each of the plurality of employees;

selecting, by each of the plurality of employees via the electronic enrollment interface, a rebalancing price at which each employee is willing to sell a portion of shares of employer stock acquired under the employee stock purchase plan at an end of an offering period;

processing, via a volatility calculation module executable by a processor residing on a remote server operated by a third party, the selected monetary contribution amount and selected rebalancing price of each of the plurality of employees in relation to historical and implied volatility of a stock price of employer stock to define a leverage value, the remote server in network communication with a financial exchange market and an employer server coupled to the electronic enrollment interface, the remote server further including a display interface comprising a user input device;

determining, via the volatility calculation module using the leverage value, whether financial leverage should be utilized to acquire shares of employer stock on the financial exchange market, the financial exchange market operating via a plurality of servers located remotely from the employer server and the remote server operated by the third party;

aggregating, via a transaction module executable by the processor residing on the remote server, each of the plurality of employees into one of a plurality of virtual containers based on the selected monetary contribution amount and selected rebalancing price of each of the plurality of employees, and displaying each of the plurality of virtual containers on the display interface;

presenting on the display interface a plurality of trade positions related to the employer stock on the financial exchange market;

sequencing, via the transaction module, order instructions for the plurality of trade positions based on the aggregated plurality of virtual containers;

responsive to a determination from the volatility calculation module that financial leverage to acquire shares of employer stock should be utilized, taking, by the third party via the display interface user input device, simultaneous short and long positions in a derivative or other financial instrument on the financial exchange market that would allow for a disposition of the shares of employer stock acquired in the employee stock purchase plan at an employee-designated strike price, the short and long positions having different strike prices, a margin requirement for the short and long positions being satisfied using the leverage;

withholding and deducting, by a payroll system coupled to the electronic enrollment interface, a plurality of selected monetary contribution amounts for acquiring shares of employer stock under the employee stock purchase plan for each of the plurality of employees, the plurality of selected monetary contribution amounts corresponding to a plurality of pay periods during the offering period, the payroll system comprising a withholdings module executable on the processor residing on the employer server;

funding or crediting, by the withholdings module, a financial or ledger account of each of the plurality of employees on the books and records of the employer or at a financial institution with the plurality of selected monetary contribution amounts during the offering period, each financial or ledger account used to purchase shares of employer stock via the employee stock purchase plan at the end of the offering period;

providing, via a monetary contribution module executable by the processor residing on the remote server, by the third party on behalf of each of the plurality of employees, a supplemental monetary contribution having a principal equal to a difference between the selected monetary contribution amount by each employee and the maximum allowable contribution under the employee stock purchase plan during the offering period and transmitting the supplemental monetary contribution to the employer of the plurality of employees on behalf of each financial or ledger account;

disbursing, via a share disbursement module executable by the processor residing on the remote server, to an unrelated third party transfer agent from the employer, instructions to issue a number of shares of employer stock required to be sold or delivered to a counterparty on the financial exchange market to comply with the selected monetary contribution amount and selected rebalancing price of each of the plurality of employees and to reimburse a supplemental monetary contribution by a third party;

disbursing, via the share disbursement module, to the third party from the employer, the number of shares of employer stock required to be sold or delivered to the counterparty on the financial exchange market to comply with the selected monetary contribution amount and selected rebalancing price of each of the plurality of employees and to reimburse the supplemental monetary contribution by the third party;

disbursing, via the share disbursement module, to each of the plurality of employees from the employer, a number of shares of employer stock equal to a difference between a maximum number of shares of employer stock acquired using an aggregate of the selected monetary contribution and the supplemental monetary contribution, and the number of shares of employer stock disbursed to the third party from the employer; and responsive to a share price of the acquired employer stock on the financial exchange market being equal to or greater than the employee-designated strike price at the end of the offering period, delivering, via the transaction module, by the third party to the counterparty on the financial exchange market, the acquired shares of employer stock pursuant to a contract with the counterparty for the derivative or other financial instrument, and returning, by the third party to the financial or ledger account of each of the plurality of employees, proceeds from the sale of the shares of employer stock to the counterparty, wherein the proceeds are equivalent to the proceeds from the employee stock purchase plan if the employee had initially contributed the maximum allowable contribution under the allowable limits of the employee stock purchase plan minus the principal of the supplemental monetary contribution;

responsive to a share price of employer stock on the financial exchange market being less than the employee-designated strike price at the end of the offering period, selling, via the transaction module, by the third party via an open market sale on the financial exchange market, at least a portion of the acquired shares of employer stock, the sale of at least a portion of the shares of employer stock comprising a sale transaction and allowing for a return of sale proceeds to the financial or ledger account of the employee, deducting the principal of the supplemental monetary contribution from the sale proceeds to reimburse the third party, and returning, by the third party to the financial or ledger account of each of the plurality of employees, any remaining sale proceeds or remaining shares from the sale transaction.

2. The method of claim 1 wherein subsequent to shares of employer stock being acquired via the plan, the method comprises:

immediately selling, via the transaction module by the third party on the financial exchange market, an amount of shares of employer stock equivalent to reimburse the principal of the supplemental monetary contribution; and returning to the third party proceeds from the sale of shares of employer stock in an amount equal to the principal of the supplemental monetary contribution.

3. The method of claim 1 wherein the supplemental monetary contribution is interest-free.

4. The method of claim 1 wherein the rebalancing price comprises at least one of a theoretical stock price, an annualized return, or a minimum internal rate of return.

5. The method of claim 4 wherein the annualized return is calculated using a forecasted date of each selected monetary contribution by the employee, a forecasted number of shares of employer stock that the employee will be able to acquire at the end of the offering period, and an estimated minimum total profit from the sale of employer stock.

6. A computer program product for maximizing a number of shares purchased under an employee stock purchase plan with limited employee capital contributions, the computer program product embodied in one or more non-transitory computer readable media having program instructions embodied therein, the program instructions executable by a processor to cause the processor to:

request a selection by each of a plurality of employees of an employer via an electronic enrollment interface for the employee stock purchase plan of a monetary contribution amount for contribution to the employee stock purchase plan to be deducted from a compensation of each of the plurality of employees per payroll period, wherein the selected contribution amount is less than a maximum allowable contribution under allowable limits of the employee stock purchase plan;

request a selection by each of the plurality of employees via the electronic enrollment interface of a rebalancing price at which each employee is willing to sell a portion of shares of employer stock acquired under the employee stock purchase plan at an end of an offering period;

process, via a volatility calculation module executable by a processor residing on a remote server operated by a third party and in network communication with an employer server and a financial exchange market, the selected monetary contribution amount and selected rebalancing price of each of the plurality of employees in relation to historical and implied volatility of a stock price of employer stock to define a leverage value, the remote server further including a display interface comprising a user input device;

determine, via the volatility calculation module using the leverage value, whether financial leverage should be utilized to acquire shares of employer stock on the financial exchange market;

aggregate, via a transaction module executable by the processor residing on the remote server, each of the plurality of employees into one of a plurality of virtual containers based on the selected monetary contribution amount and selected rebalancing price of each of the plurality of employees and display each of the plurality of virtual containers on the display interface;

present on the display interface a plurality of trade positions related to the employer stock on the financial exchange market;

sequence, via the transaction module, order instructions for the plurality of trade positions based on the aggregated plurality of virtual containers;

responsive to a determination from the volatility calculation module that financial leverage to acquire shares of employer stock should be utilized, enable the taking, via the transaction module by the third party via the display interface user input device, of simultaneous short and long positions in a derivative or other financial instrument on the financial exchange market that would allow for a disposition of shares of employer stock acquired in the plan at an employee-designated strike price, the short and long positions having different strike prices, a margin requirement for the short and long positions being satisfied using the leverage;

request, from a payroll system coupled to the electronic enrollment interface, withholding or deduction of a plurality of selected monetary contribution amounts for acquiring shares of employer stock under the employee stock purchase plan for each of the plurality of employees, the plurality of selected monetary contribution amounts corresponding to a plurality of pay periods during the offering period, the payroll system comprising a withholdings module executable on a processor residing on an employer server;

request, from the payroll system, funding or crediting of a financial or ledger account of each of the plurality of employees on the books and records of the employer or at a financial institution with the plurality of selected monetary contribution amounts during the offering period, each financial or ledger account used to purchase shares of employer stock via the employee stock purchase plan at the end of the offering period;

request, via a monetary contribution module executable by the processor residing on the remote server, from a third party on behalf of each of the plurality of employees, transmission of a supplemental monetary contribution having a principal equal to a difference between the selected monetary contribution amount by each employee and the maximum allowable contribution under the employee stock purchase plan during the offering period, each supplemental monetary contribution transmitted to the employer of the plurality of employees on behalf of each financial or ledger account;

enable disbursement, via a share disbursement module executable by the processor residing on the remote server, to an unrelated third party transfer agent from the employer, of instructions to issue a number of shares of employer stock required to be sold or delivered to a counterparty on a financial exchange market to comply with the selected monetary contribution amount and selected rebalancing price of each of the plurality of employees and to reimburse a supplemental monetary contribution by a third party;

enable disbursement, via the share disbursement module, to the third party from the employer, of the number of shares of employer stock required to be sold or delivered to the counterparty on the financial exchange market to comply with the selected monetary contribution amount and selected rebalancing price of each of the plurality of employees and to reimburse the supplemental monetary contribution by the third party;

enable disbursement, via the share disbursement module, to each of the plurality of employees from the employer, of a number of shares of employer stock equal to a difference between a maximum number of shares of employer stock acquired using an aggregate of the selected monetary contribution and the supplemental monetary contribution, and the number of shares of employer stock disbursed to the third party from the employer;

responsive to a share price of the acquired employer stock on the financial exchange market being equal to or greater than the employee-designated strike price at the end of the offering period, enable the delivery, via the transaction module, by the third party to the counterparty on the financial exchange market, of the acquired shares of employer stock pursuant to a contract with the counterparty for the derivative or other financial instrument, and enable the return, by the third party to the financial or ledger account of each employee, of proceeds from the sale of the shares of employer stock to the counterparty, wherein the proceeds are equivalent to the proceeds from the plan if the employee had initially contributed the maximum allowable contribution under the allowable limits of the plan minus the principal of the supplemental monetary contribution; and responsive to a share price of employer stock on the financial exchange market being less than the employee-designated strike price at the end of the offering period, enable the sale, via the transaction module, by the third party via an open market sale on the financial exchange market, of at least a portion of the acquired shares of employer stock, the sale of at least a portion of the shares of employer stock comprising a sale transaction and allowing for a return of sale proceeds to a financial or ledger account of the employee, enable the deduction of the principal of the supplemental monetary contribution by the third party from the sale proceeds to reimburse the third party, and enable the return, by the third party to the financial or ledger account of the employee, of any remaining sale proceeds or remaining shares from the sale transaction.

7. The computer program product of claim 6 wherein the program instructions executable by the processor further cause the processor to perform the steps of:

subsequent to shares of employer stock being acquired via the plan, immediately selling, via the transaction module, by the third party on the financial exchange market, an amount of shares of employer stock equivalent to reimburse the principal of the supplemental monetary contribution; and returning to the third party proceeds from the sale of shares of employer stock in an amount equal to the principal of the supplemental monetary contribution.

8. The computer program product of claim 6 wherein the supplemental monetary contribution is interest-free.

9. The computer program product of claim 6 wherein the rebalancing price comprises at least one of a theoretical stock price, an annualized return, or a minimum internal rate of return.

10. The computer program product of claim 9 wherein the annualized return is calculated using a forecasted date of each selected monetary contribution by the employee, a forecasted number of shares of employer stock that the employee will be able to purchase at the end of the offering period, and an estimated minimum total profit from the sale of employer stock.

11. A computer-implemented system for maximizing a number of shares purchased under an employee stock purchase plan with limited employee capital contributions, comprising:

an electronic enrollment interface for the employee stock purchase plan comprising a graphical user interface for permitting selection of enrollment parameters by an employee of an employer, the electronic enrollment interface comprising functionality to:

receive, from each of a plurality of employees via the electronic enrollment interface, a selection of a monetary contribution amount for contribution to the employee stock purchase plan to be deducted from a compensation of each of the plurality of employees per payroll period, wherein the selected contribution amount is less than or equal to a maximum allowable contribution under allowable limits of the employee stock purchase plan; and receive, from each of the plurality of employees via the electronic enrollment interface, a selection of a rebalancing price at which each employee is willing to sell a portion of shares of employer stock acquired under the employee stock purchase plan at an end of an offering period;

a payroll system coupled to the electronic enrollment interface and comprising:

a withholdings module executable by a processor residing on an employer server and comprising functionality to:

withhold and deduct a plurality of selected monetary contribution amounts for acquiring shares of employer stock under the employee stock purchase plan for each of the plurality of employees, the plurality of selected monetary contribution amounts corresponding to a plurality of pay periods during the offering period; and fund or credit a financial or ledger account of each of the plurality of employees on the books and records of the employer or at a financial institution with the selected monetary contribution amount during the offering period, each financial or ledger account used to purchase shares of employer stock via the employee stock purchase plan at the end of the offering period; and a share disbursement module executable by the processor residing on the employer server and comprising functionality to:

disburse, to an unrelated third party transfer agent from the employer, instructions to issue a number of shares of employer stock required to be sold or delivered to a counterparty on a financial exchange market to comply with the selected monetary contribution amount and selected rebalancing price of each of the plurality of employees and to reimburse a supplemental monetary contribution by a third party;

disburse, to the third party from the employer, the number of shares of employer stock required to be sold or delivered to the counterparty on the financial exchange market to comply with the selected monetary contribution amount and selected rebalancing price of each of the plurality of employees and to reimburse the supplemental monetary contribution by the third party; and disburse, to each of the plurality of employees from the employer, a number of shares of employer stock equal to a difference between a maximum number of shares of employer stock acquired using an aggregate of the selected monetary contribution and the supplemental monetary contribution, and the number of shares of employer stock disbursed to the third party from the employer;

and a remote server operated by the third party and in network communication with the employer server and the financial exchange market, the remote server including a display interface comprising a user input device and a hardware processor comprising:

a monetary contribution module executable by the hardware processor and comprising functionality to:

provide, by the third party on behalf of each of the plurality of employees, the supplemental monetary contribution having a principal equal to a difference between the selected monetary contribution amount by each employee and the maximum allowable contribution under the employee stock purchase plan during the offering period;

and transmit the supplemental monetary contribution to the employer on behalf of each financial or ledger account;

a volatility calculation module executable by the hardware processor and comprising functionality to:

process the selected monetary contribution amount and selected rebalancing price of each of the plurality of employees in relation to historical and implied volatility of a stock price of employer stock to define a leverage value; and determine, using the leverage value, whether financial leverage should be utilized to acquire shares of employer stock on the financial exchange market, the financial exchange market operating via a plurality of servers located remotely from the employer server and the remote server operated by the third party;

a transaction module executable by the hardware processor and comprising functionality to:

aggregate each of the plurality of employees into one of a plurality of virtual containers based on the selected monetary contribution amount and selected rebalancing price of each of the plurality of employees and display each of the plurality of virtual containers on the display interface;

present on the display interface a plurality of trade positions related to the employer stock on the financial exchange market;

sequence order instructions for the plurality of trade positions based on the aggregated plurality of virtual containers;

responsive to a determination from the volatility calculation module that financial leverage to acquire shares of employer stock should be utilized, allow for selection on the display interface by the third party via the user input device of simultaneous short and long positions in a derivative or other financial instrument on the financial exchange market that would allow for a disposition of the shares of employer stock acquired in the employee stock purchase plan at an employee-designated strike price, the short and long positions having different strike prices, a margin requirement for the short and long positions being satisfied using the leverage; and responsive to a share price of the acquired employer stock on the financial exchange market being equal to or greater than the employee-designated strike price at the end of the offering period, deliver, by the third party to the counterparty on the financial exchange market, the acquired shares of employer stock pursuant to a contract with the counterparty for the derivative or other financial instrument; and return, by the third party to the financial or ledger account of each of the plurality of employees, proceeds from the sale of the shares of employer stock to the counterparty, wherein the proceeds are equivalent to the proceeds from the employee stock purchase plan if the employee had initially contributed the maximum allowable contribution under the allowable limits of the employee stock purchase plan minus the principal of the supplemental monetary contribution;

responsive to a share price of employer stock on the financial exchange market being less than the employee-designated strike price at the end of the offering period, sell, by the third party via an open market sale on the financial exchange market, at least a portion of the acquired shares of employer stock, the sale of at least a portion of the shares of employer stock comprising a sale transaction and allowing for a return of sale proceeds to the financial or ledger account of the employee; deduct the principal of the supplemental monetary contribution from the sale proceeds to reimburse the third party; and return, by the third party to the financial or ledger account of the employee, any remaining sale proceeds or remaining shares from the sale transaction.

12. The computer-implemented system according to claim 11, wherein the electronic enrollment interface acquires employee enrollment data on a basis of unique elections made by each of the plurality of employees within limitations of regulatory and employee stock purchase plan-designed constraints which the electronic enrollment interface is programmed to identify.

13. The computer-implemented system according to claim 11, wherein the electronic enrollment interface further comprises an electronic signature capture for executing relevant legal documents used in the employee stock purchase plan prior to execution of a trade of employer stock.

14. The computer-implemented system according to claim 11, wherein the contribution calculation module further comprises an employee repository containing at least the selected monetary contribution amount and the selected rebalancing price of each of the plurality of employees, and basic demographic information of each of the plurality of employees.

15. The computer-implemented system according to claim 14, wherein the employee selections are associated based on monetary contribution amount, salary, selected rebalancing price, and conditional values, and wherein the employee selections in the employee repository are associated with risk values and trade execution group values.

16. The computer-implemented system according to claim 14, wherein the selection values are defined as one of a plurality of risk values selected from the group comprising high risk values, medium risk values and low risk values, and are assigned to one of the plurality of virtual containers based upon the selected rebalancing price.

17. The computer-implemented system according to claim 16, wherein each of the plurality of risk values ranges from at least 1 to 100, wherein 1 is the lowest value and 100 is the highest value.

18. The computer-implemented system according to claim 11, wherein the volatility calculation module further comprises a filter for sorting each of the plurality of employees based upon the selected monetary contribution amount and the selected rebalancing price of each of the plurality of employees.

* * * * *